United States Patent
Ha

(10) Patent No.: US 8,867,391 B2
(45) Date of Patent: Oct. 21, 2014

(54) METHOD AND APPARATUS FOR ERROR CORRECTION CIPHERING IN MOBILE COMMUNICATION SYSTEM

(75) Inventor: In-Dae Ha, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 216 days.

(21) Appl. No.: 13/479,215

(22) Filed: May 23, 2012

(65) Prior Publication Data

US 2012/0300614 A1 Nov. 29, 2012

(30) Foreign Application Priority Data

May 23, 2011 (KR) .................. 10-2011-0048327

(51) Int. Cl.
*H04L 12/56* (2006.01)
*H04L 29/06* (2006.01)
*H04L 1/00* (2006.01)

(52) U.S. Cl.
CPC .............. *H04L 69/22* (2013.01); *H04L 1/0072* (2013.01); *H04L 1/0045* (2013.01)

USPC ............ 370/252; 370/394; 714/701; 714/751

(58) Field of Classification Search
USPC .............. 370/241, 241.1, 242, 248, 249, 252; 375/240.27, 243; 714/699, 701, 746, 714/747, 751
See application file for complete search history.

(56) References Cited

U.S. PATENT DOCUMENTS

2007/0041382 A1* 2/2007 Vayanos et al. ............... 370/394
2008/0123655 A1* 5/2008 Kim et al. ..................... 370/394

* cited by examiner

*Primary Examiner* — Kerri Rose

(57) ABSTRACT

A method for error correction deciphering of a receive apparatus in a mobile communication system includes receiving a Packet Data Convergence Protocol (PDCP) packet. The method also includes, when error correction ciphering is set, acquiring a partial Hyper Frame Number (HFN) from the PDCP packet. The method further includes comparing the partial HFN and the receive apparatus's own lower HFN of a constant bit count. The method still further includes, if the partial HFN and the receive apparatus's own lower HFN of the constant bit count are different from each other, performing an HFN correction function.

20 Claims, 12 Drawing Sheets

| D/C | R | R | R | PDCP SN | Oct 1 510 |
| --- | --- | --- | --- | --- | --- |
| PDCP SN (cont.) | | | | | Oct 2 520 |
| Partial HFN | | | | | Oct 3 530 |
| Data | | | | | Oct 4 540 |

METHOD AND APPARATUS FOR ERROR CORRECTION CIPHERING IN MOBILE COMMUNICATION SYSTEM

CROSS-REFERENCE TO RELATED APPLICATION(S) AND CLAIM OF PRIORITY

The present application is related to and claims the benefit under 35 U.S.C. §119(a) of a Korean patent application filed in the Korean Intellectual Property Office on May 23, 2011 and assigned Ser. No. 10-2011-0048327, the entire disclosure of which is hereby incorporated by reference.

TECHNICAL FIELD OF THE INVENTION

The present disclosure relates to error correction. More particularly, the present disclosure relates to a method and apparatus for ciphering including an error correction function upon information transmission or reception between an enhanced Node B (eNB) and a User Equipment (UE) in a mobile communication system.

BACKGROUND OF THE INVENTION

In a mobile communication system, when ciphering or deciphering is carded out at a transmission or reception side, the ciphering or deciphering result changes because of the existence of different parameters among ciphering or deciphering parameters.

Also, it is difficult or impossible to determine if the deciphered result is the same data as the original data or different data. Despite the different data, a UE forwards the different data to an application program, and an eNB forwards the different data to a Serving-Gateway (S-GW). The thus forwarded different data is discarded at the final user end.

In this ciphering/deciphering scheme, when one of the ciphering parameters changes due to the existence of internal or external errors, there is a problem that, because there is no restoration procedure until before the release of a corresponding radio bearer, erroneous packets can be continuously forwarded.

Accordingly, there is a need for a method and apparatus for, at ciphering/deciphering, restoring an error occurring because a ciphering parameter changes.

In a Long Term Evolution (LTE) system, a packet can be discarded when the packet is not transmitted during a predetermined time. A discard timer may be used for this function. The discard timer performs the function in a PDCP of a protocol stack. However, there is a problem that the current discard timer has no consideration for handover.

A UE can apply a discard timer for the same packet before and after the handover. However, an eNB has a problem that, when a serving, eNB changes before and after handover, a current serving eNB cannot use a discard timer used in an existing serving eNB. That is, in the current standard, there is a problem that, before and after handover and at non-occurrence of handover, there is no consistency in applying a discard timer to a downlink packet of an eNB.

In bad propagation environments, it can take much longer to transmit a packet, which has gone through a PDCP layer, through Radio Link Control/Media Access Control/Physical (RLC/MAC/PHY) layers than a maximum 1,500 milliseconds (ms) of a current discard timer. For example, when a Transmission Control Protocol (TCP) application program moves to a had location from a location of good propagation environments, a packet passes through a PDCP layer but the bad radio environments lead to an increase of a period of time for which the packet stands ready under an RLC layer as much as an increased window size.

When moving to a bad location from a situation in which a TCP window is increased in size (i.e., a location of good radio environments), there is a problem that, when a current discard timer value is ever used, many packets are discarded because of the expiration of a discard timer.

Also, in this situation, when the discard timer value is used limitless, there is a problem that it is difficult or impossible to control packet transmission using the discard timer in an eNB and a UE.

SUMMARY OF THE INVENTION

To address the above-discussed deficiencies of the prior art, it is a primary aspect of the present disclosure is to provide a method and apparatus for error correction ciphering in a mobile communication system.

Another aspect of the present disclosure is to provide a method and apparatus for error correction that can occur during a ciphering/deciphering process between an enhanced Node B (eNB) and a User Equipment (UE) in a mobile communication system, specially, Long Term Evolution (LTE).

A further aspect of the present disclosure is to provide a method and apparatus for, even upon handover, enabling the use of a discard timer in a mobile communication system.

The above aspects are achieved by providing a method and apparatus for error correction ciphering in a mobile communication system.

According to one aspect of the present disclosure, a method for error correction deciphering of a receive apparatus in a mobile communication system is provided. The method includes receiving a Packet Data Convergence Protocol (PDCP) packet. The method also includes, when error correction ciphering is set, acquiring a partial Hyper Frame Number (HFN) from the PDCP packet. The method further includes comparing the partial HFN and the receive apparatus's own lower HFN of a constant bit count. The method still further includes, if the partial HFN and the receive apparatus's own lower HFN of the constant bit count are different from each other, performing an HFN correction function.

According to another aspect of the present disclosure, a method for error correction ciphering of a transmit apparatus in a mobile communication system is provided. The method includes, when error correction ciphering is set, acquiring as many lower bits as a constant bit count from the transmit apparatus's own HFN. The method also includes determining the transmit apparatus's own lower HFN of the constant bit count in a PDCP packet to complete the PDCP packet. The method further includes transmitting the completed PDCP packet.

According to a further aspect of the present disclosure, a receive apparatus for error correction deciphering in a mobile communication system is provided. The apparatus includes a modulator/demodulator (modem) and a controller. The modem is configured to receive a PDCP packet. When error correction ciphering is set, the controller is configured to acquire a partial HFN from the PDCP packet, compares the partial HEN and the receive apparatus's own lower HFN of a constant bit count, and, if the partial HFN and the receive apparatus's own lower HFN of the constant bit count are different from each other, performs an HFN correction function.

According to a yet another aspect of the present disclosure, a transmit apparatus for error correction ciphering in a mobile communication system is provided. The apparatus includes a controller and a modem. When error correction ciphering is set, the controller is configured to acquire as many lower bits as a constant bit count from the transmit apparatus's own HFN, and include the transmit apparatus's own lower HFN of the constant bit count in a PDCP packet to complete the PDCP packet. The modem is configured to transmit the completed PDCP packet.

According to a still another aspect of the present disclosure, a method for timer setting of a target eNB in a mobile communication system is provided. The method includes determining whether or not a received packet is a forwarding packet. The method also includes, if the received packet is the forwarding packet and is a retransmission packet, determining if a discard timer value for the oldest packet of a source eNB exists in a received handover request message. The method further includes, if the discard timer value for the oldest packet of the source eNB exists, and a discard timer value of the target eNB is not greater than the discard timer value for the oldest packet of the source eNB, setting a discard timer of the received packet to the discard timer value of the target eNB.

According to another aspect of the present disclosure, an apparatus of a target eNB for setting a timer in a mobile communication system is provided. The apparatus includes a backhaul communication unit and a controller. The backhaul communication unit is configured to communicate with a source eNB. The controller is configured to determine whether or not a received packet is a forwarding packet, if the received packet is the forwarding packet and is a retransmission packet, determine if a discard timer value for the oldest packet of the source eNB exists in a received handover request message, and, if the discard timer value for the oldest packet of the source eNB exists, and a discard timer value of the target eNB is not greater than the discard timer value for the oldest packet of the source eNB, set a discard timer of the received packet to the discard timer value of the target eNB.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 12, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

Preferred embodiments of the present disclosure will be described herein below with reference to the accompanying drawings. In the following description, well-known functions or constructions are not described in detail since they would obscure the disclosure in unnecessary detail. Also, terms described below, which are defined considering functions in the present disclosure, can be different depending on user and operator's intention or practice. Therefore, the terms should be defined on the basis of the disclosure throughout this specification.

Below, the present disclosure describes a method and apparatus for error correction ciphering in a mobile communication system. In an LTE system, an air interface represents an interface between a User Equipment (UE) and an enhanced Node B (eNB), and a corresponding protocol stack is illustrated as in FIG. 1.

Figure 1:
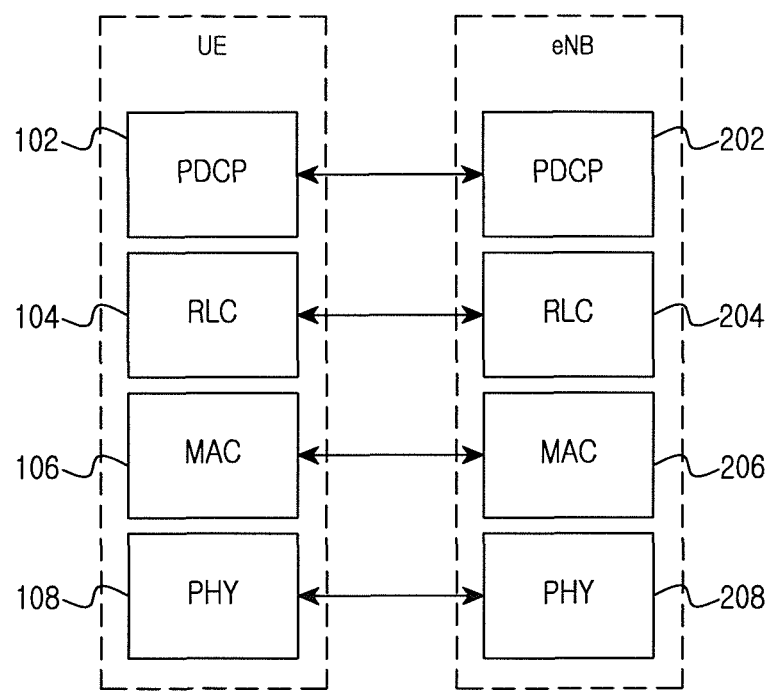
FIG. 1 is a diagram illustrating a protocol stack in a Long Term Evolution (LTE) system according to an embodiment of the present disclosure.

FIG. 1 is a diagram illustrating a protocol stack in a Long Term Evolution (LTE) system according to an embodiment of the present disclosure.

FIG. 1 illustrates protocol stacks of a UE and an eNB.

Packet Data Convergence Protocol (PDCP) layers 102 and 202 indicate layers taking charge of security. Radio Link Control (RLC) layers 104 and 204 and Medium Access Control (MAC) layers 106 and 206 indicate layers for connection management. Physical (PHY) layers 108 and 208 indicate physical layers for real information transmission.

Regarding the PDCP layers 102 and 202, integrity and ciphering are applied to a Signaling Radio Bearer (SRB) used for call control, and only the ciphering is applied to a Data Radio Bearer (DRB) used for real data transmission.

Presently, an LTE system uses three ciphering algorithms as shown in Table 1 below.

TABLE 1

| Code | Type of ciphering | Remarks |
| --- | --- | --- |
| "$0000_2$" | EEA0 | Null ciphering algorithm |
| "$0001_2$" | 128-EEA1 | Error Correction SNOW 3G based algorithm |
| "$0010_2$" | 128-EEA2 | Error Correction AES based algorithm |

In Table 1, the 'EEA0' is a null ciphering algorithm. In the other two algorithms, the primary parameters are KEY, COUNT, BEARER, DIRECTION, and LENGTH. Among these, KEY, COUNT, DIRECTION, and LENGTH are determined when a radio bearer is set, and are kept until before the radio bearer is released. However, a COUNT value increases whenever a packet is transmitted.

Figure 2:
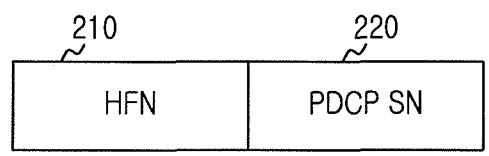
FIG. 2 is a diagram illustrating a construction of a COUNT parameter according to an embodiment of the present disclosure.

FIG. 2 is a diagram illustrating a construction of a COUNT according to an embodiment of the present disclosure.

Referring to FIG. 2, the COUNT is composed of a Hyper Frame Number (HFN) 210 and a PDCP Sequence Number (SN) 220, and is 32 bits in length.

The PDCP SN 220 can be composed of 5 bits, 7 bits, and 12 bits as shown in Table 2 below and, particularly, a data radio bearer is composed of 7 bits and 12 bits.

TABLE 2

| Length | Description |
| --- | --- |
| 5 | Signaling Radio Bearer(SRB) |
| 7 | Data Radio Bearer (DRB), if configured by upper layers |
| 12 | Data Radio Bearer (DRB), if configured by upper layers |

When the PDCP SN 220 is equal to 5 bits, the HFN 210 is 27 bits. When the PDCP SN 220 is equal to 7 bits, the HFN 210 is 25 bits. When the PDCP SN 220 is equal to 12 bits, the HEN 210 is 20 bits.

At a time the radio bearer is set (excepting handover), the HFN 210 and the PDCP SN 220 are set to an initial value of '0d'. After that, whenever one packet is transmitted, the PDCP SN 220 increases by T. After the PDCP SN 220 becomes a Maximum_PDCP_SN (e.g., 4095 for 12 bits), at a time a next packet is transmitted, the PDCP SN 220 becomes '0' and the HFN 210 increases by '1'.

Figure 3:
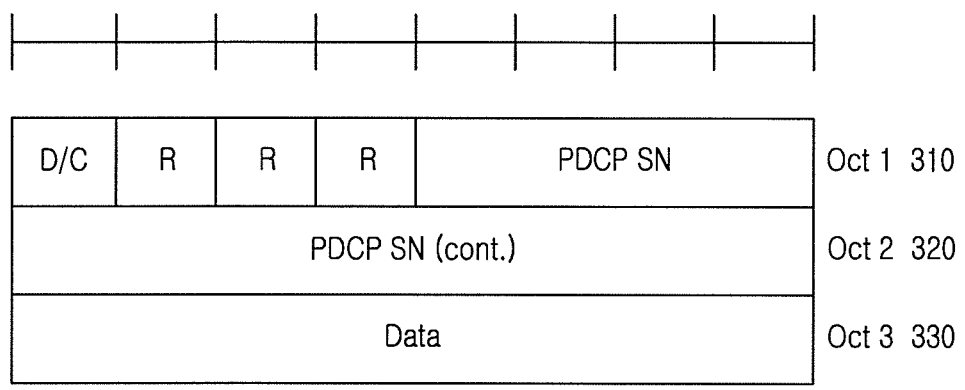
FIG. 3 is a diagram illustrating a Packet Data Convergence Protocol (PDCP) packet when a Sequence Number (SN) according to the present disclosure is equal to 12 bits.

FIG. 3 is a diagram illustrating a PDCP packet when a SN according to the present disclosure is equal to 12 bits.

FIG. 3 illustrates a situation where a PDCP SN 310 or 320 is equal to 12 bits. It can be appreciated that data 330 also is transmitted together with the PDCP SN 310 or 320. However, an HFN is not transmitted, and a transmission side and a reception side each manage the HFN.

Figure 4:
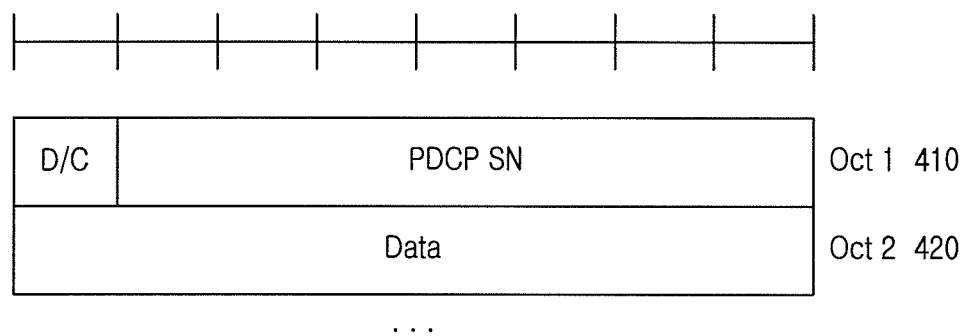
FIG. 4 is a diagram illustrating a PDCP packet when a SN according to the present disclosure is equal to 7 bits.

FIG. 4 is a diagram illustrating a PDCP packet when a SN according to the present disclosure is equal to 7 bits.

FIG. 4 illustrates a situation where a PDCP SN 410 is equal to 7 bits. It can be appreciated that data 420 also is transmitted together with the PDCP SN 410. However, an HFN is not transmitted, and a transmission side and a reception side each manage the HFN.

For a data radio bearer, there are two kinds of radio bearers among which one is a RLC Acknowledgement (RLC AM) and the other is a RLC Unacknowledgement (RLC UM).

For the RLC UM, when a next packet (Next_PDCP_RX_SN) of a received packet is greater than a Maximum_PDCP_SN, the next packet (Next_PDCP_RX_SN) is equal to '0' and an HFN value increases by '1'.

For the RLC AM, when a packet is received within a Reordering_Window (2048 in size), the packet is considered to be a valid packet, and an HFN increases by '1' in the following situations: Next_PDCP_RX_SN−reception PDCP SN>Reordering_Window; and reception PDCP SN>=Next_PDCP_RX_SN and Next_PDCP_RX_SN>Maximum_PDCP_SN.

Among ciphering/deciphering parameters, a highly changeable parameter is a COUNT. In the COUNT parameter, a PDCP SN cannot be changed because it is included within a packet, but an HFN can be changed due to a faulty operation because an eNB and a UE each manage the HFN. Also, a COUNT value is not restored if changing. This represents that, although packet transmission is possible, packets are discarded in an application program of the final user end.

At a time a UE and an eNB determine a ciphering algorithm, the present disclosure adds the type of an error correction algorithm as shown in Table 3 below.

TABLE 3

| Code | Type of ciphering | Remarks |
| --- | --- | --- |
| "$0011_2$" | 128-EEA1 | Error Correction SNOW 3G based algorithm |
| "$0100_2$" | 128-EEA2 | Error Correction AES based algorithm |

In Table 3 above, a code value of "$0011_2$" represents an error correction SNOW 3G based algorithm, and a code value of "$0100_2$" represents an error correction Advanced Encryption Standard (AES) based algorithm.

Figure 5:
FIG. 5 is a diagram illustrating a PDCP packet when a SN according to an embodiment of the present disclosure is equal to 12 bits.

FIG. 5 is a diagram illustrating a PDCP packet when a SN according to an embodiment of the present disclosure is equal to 12 bits.

Referring to FIG. 5, when a UE and an eNB determine a ciphering algorithm, the present disclosure includes and transmits a partial HFN 530 of 1 byte in a PDCP packet, additionally to PDCP SNs 510 and 520 and data 540. Here, the partial HFN of 1 byte represents a lower 8 bits among the whole HFN.

Figure 6:
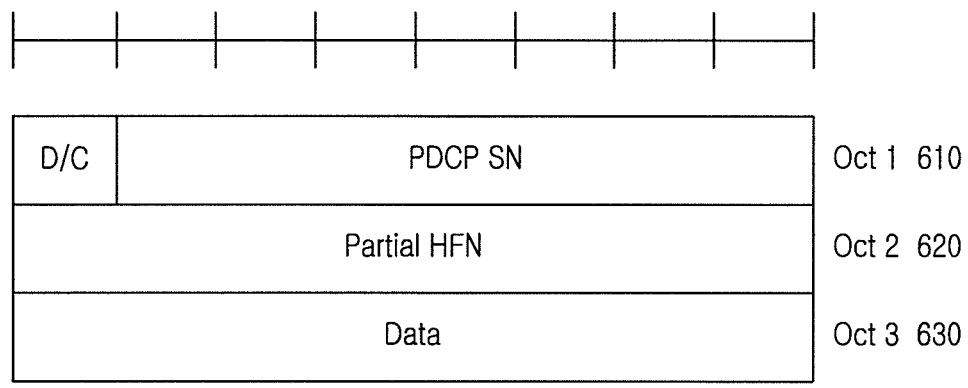
FIG. 6 is a diagram illustrating a PDCP packet when a SN according to an embodiment of the present disclosure is equal to 7 bits.

FIG. 6 is a diagram illustrating a PDCP packet when a SN according to an, embodiment of the present disclosure is equal to 7 bits.

Referring to FIG. 6, when a UE and an eNB determine a ciphering algorithm, the present disclosure includes and transmits a partial HFN 620 of 1 byte in a PDCP packet, additionally to a PDCP SN 610 and data 630. Here, the partial HEN of 1 byte represents a lower 8 bits among the whole HFN.

Figure 7:
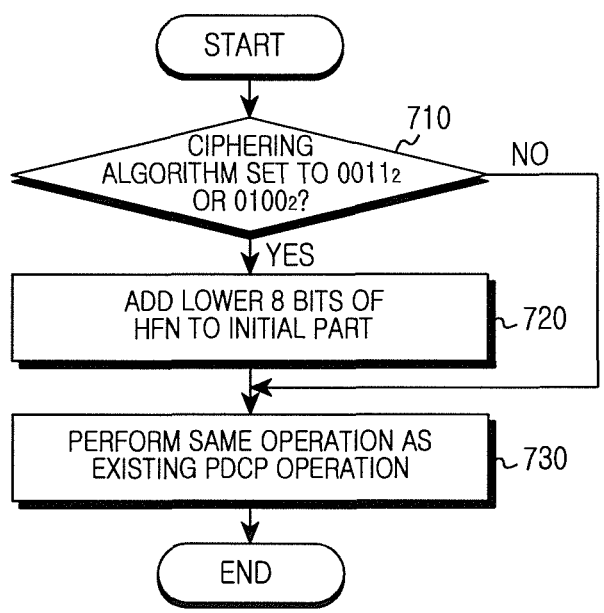
FIG. 7 is a flowchart illustrating an operation process of a transmit apparatus according to an embodiment of the present disclosure.

FIG. 7 is a flowchart illustrating an operation process of a transmit apparatus according to an embodiment of the present disclosure.

Referring to 7, the transmit apparatus, which is an apparatus transmitting a PDCP packet, can be a UE or an eNB according to a subject transmitting the PDCP packet.

If a ciphering scheme of a data radio bearer is set to an error correction scheme, that is, a ciphering algorithm is set to "$0011_2$" or "$0100_2$" in block 710, in block 720, the transmit apparatus adds a partial HFN of a size of 1 byte to a PDCP packet at the time of PDCP packet configuration. Here, the partial HFN of the size of 1 byte represents a lower 8 bits among the whole HFN.

After that, in block 730, the transmit apparatus performs the same operation as an existing PDCP operation. This process represents a process of transmitting a PDCP packet including a partial HFN to a reception side.

If the ciphering scheme of the data radio bearer is not set to the error correction scheme (that is, the ciphering algorithm is not set to "$0011_2$" or "$0100_2$" in block 710), the transmit apparatus jumps to block 730 and performs the same operation as the existing PDCP operation. This represents a process of transmitting a general PDCP packet to a reception side.

Figure 8:
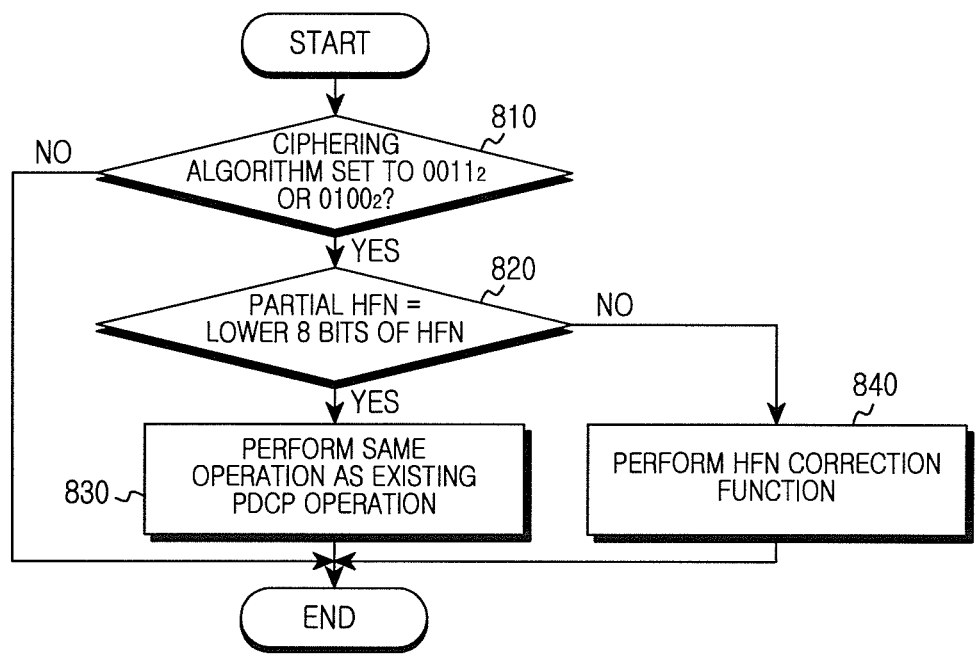
FIG. 8 is a flowchart illustrating an operation process of a receive apparatus according to an embodiment of the present disclosure.

FIG. 8 is a flowchart illustrating an operation process of a receive apparatus according to an embodiment of the present disclosure.

Referring to FIG. 8, the receive apparatus, which is an apparatus receiving a PDCP packet, can be a UE or an eNB according to a subject receiving the PDCP packet.

If a ciphering scheme of a data radio bearer is set to an error correction scheme, that is, a ciphering algorithm is set to "$0011_2$" or "$0100_2$" in block 810, the receive apparatus compares a partial HFN included in the received PDCP packet with a lower 8 bits of its own HFN.

If the comparison result of block 820 is that the partial HFN is equal to the lower 8 bits of its own HFN, in block 830, the receive apparatus determines that its own HFN and a HFN of a transmit apparatus are the same as each other, and performs the same operation as an existing PDCP operation. Here, performing the same operation represents an operation of processing the received PDCP packet.

If the comparison result of block 820 is that the partial HFN is not equal to the lower 8 bits of its own HFN, in block 840, the receive apparatus determines that its own HFN and the HFN of the transmit apparatus are not the same as each other, and performs a HFN correction function so as to correct a ciphering error. The HFN correction function will be described below.

Figure 9:
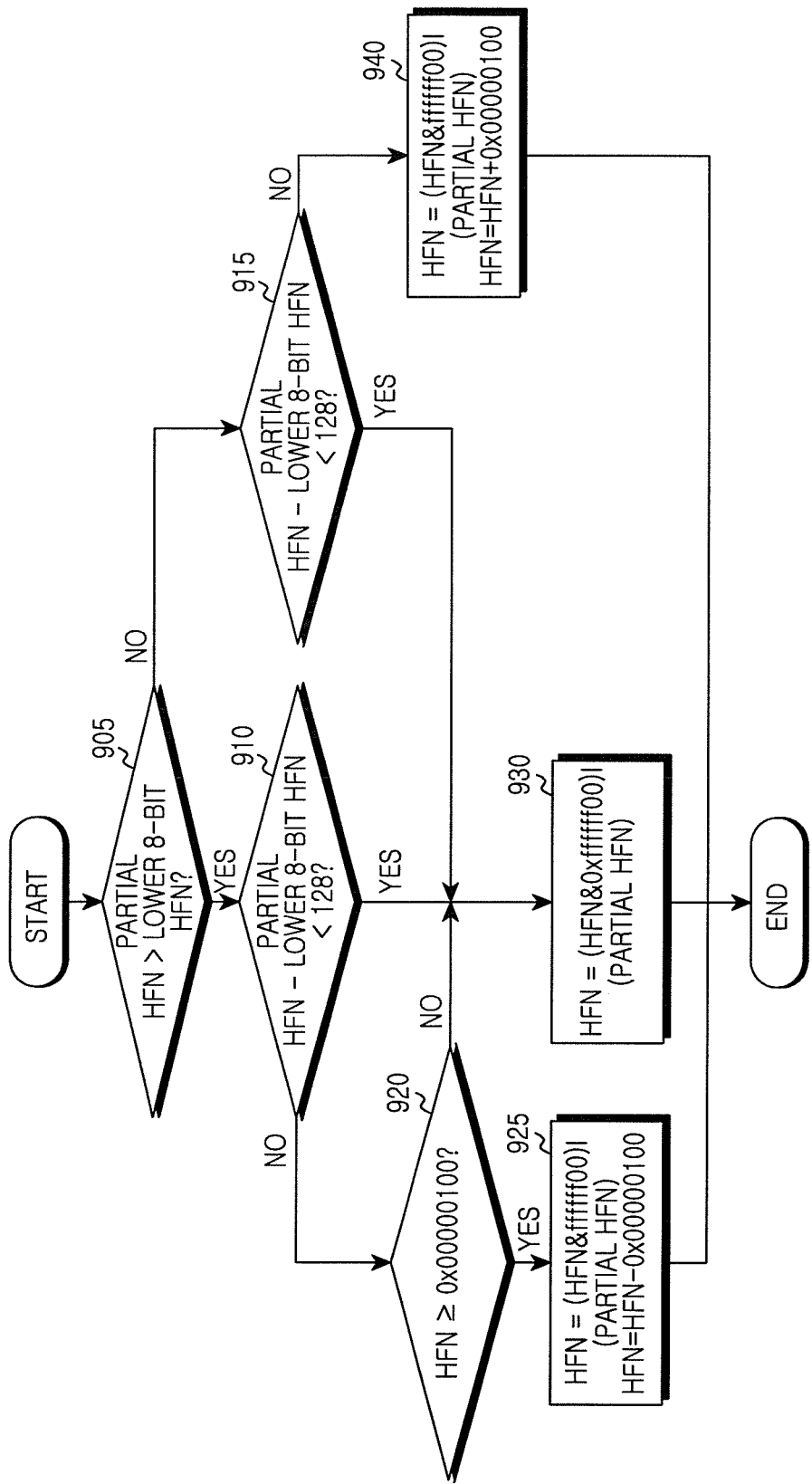
FIG. 9 is a flowchart illustrating a process of performing a Hyper Frame Number (HFN) correction function according to an embodiment of the present disclosure.

FIG. 9 is a flowchart illustrating a process of performing a HFN correction function according to an embodiment of the present disclosure.

FIG. 9 illustrates an operation of a receive apparatus when a partial HFN is not equal to a lower 8 bits of an HFN (hereinafter, referred to as a "lower 8-bit HFN") of the receive apparatus in FIG. 8. If the partial HFN is greater than the lower 8-bit HFN in block 905 and a difference between the partial HFN and the lower 8-bit HFN is less than '128' in block 910, the receive apparatus proceeds to block 930 and determines that its own HFN is less than an HFN of a transmit apparatus, and sets the lower 8 bits of its own HFN like the partial HFN. This process represents a process of adapting the HFN of the receive apparatus to the HFN of the transmit apparatus because the HFN of the receive apparatus is less than the HFN of the transmit apparatus.

If the partial HFN is greater than the lower 8-bit HFN in block 905, but the difference between the partial HFN and the lower 8-bit HFN is greater than '128' in block 910 and its own HFN is equal to or greater than '256' in block 920, the receive apparatus determines that its own HFN is greater than the HFN of the transmit apparatus. Accordingly, in block 925, the receive apparatus sets the lower 8 bits of its own HFN like the partial HFN, and subtracts '256' from its own HFN. This process represents a process of adapting the HFN of the receive apparatus to the HFN of the transmit apparatus because the HFN of the receive apparatus is greater than the HFN of the transmit apparatus.

If the partial HFN is less than the lower 8-bit HFN in block 905 and the difference between the partial HFN and the lower 8-bit HFN is less than '128' in block 915, in block 930, the receive apparatus determines that its own HFN is greater than the HFN of the transmit apparatus, and sets the lower 8 bits of its own HFN like the partial HFN. This process represents a process of adapting the HFN of the receive apparatus to the HFN of the transmit apparatus because the HFN of the receive apparatus is greater than the HFN of the transmit apparatus.

If the partial HFN is less than the lower 8-bit HFN in block 905, but the difference between the partial HFN and the lower 8-bit HFN is greater than '128' in block 915, the receive apparatus determines that its own HFN is less than the HFN of the transmit apparatus and, in block 940, sets the lower 8 bits of its own HFN like the partial HFN and subtracts '256' from its own HFN. This process represents a process of adapting the HFN of the receive apparatus to the HFN of the transmit apparatus because the HFN of the receive apparatus is less than the HFN of the transmit apparatus.

In the present disclosure, a description is made assuming that an eNB is a transmit apparatus, and a UE is a receive apparatus. However, in an embodiment, the eNB can be a receive apparatus and the UE can be a transmit apparatus according to the packet transmission/reception environments.

Figure 10:
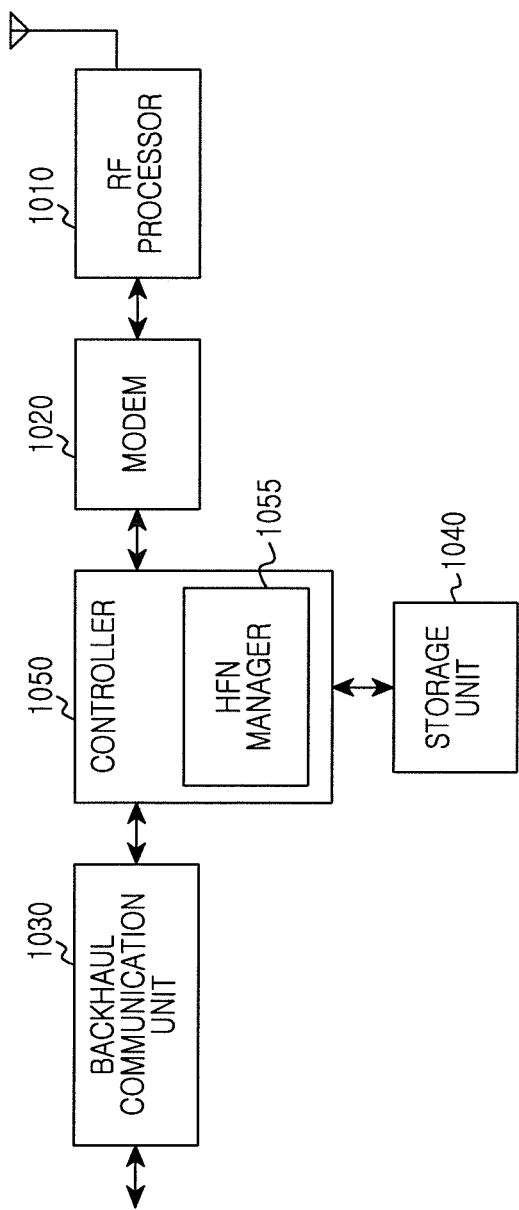
FIG. 10 is a block diagram illustrating a construction of an enhanced Node B (eNB) according to an embodiment of the present disclosure.

FIG. 10 is a block diagram illustrating a construction of an eNB according to an embodiment of the present disclosure.

Referring to FIG. 10, an interfering eNB includes a Radio Frequency (RF) processor 1010, a modulator/demodulator (modem) 1020, a backhaul communication unit 1030, a storage unit 1040, and a controller 1050.

The RF processor 1010 performs a function for transmitting and receiving a signal through a wireless channel such as signal band conversion, amplification and the like. That is, the RF processor 1010 up converts a baseband signal provided from the modem 1020 into an RF band signal and transmits the RF band signal through an antenna, and down converts an RF band signal received through the antenna into a baseband signal.

The modem 1020 performs a function of conversion between a baseband signal and a bit stream according to a physical layer standard of a system. For example, at data transmission, the modem 1020 creates complex symbols by coding and modulating a transmission bit stream, maps the complex symbols to subcarriers, and then constructs OFDM symbols through an Inverse Fast Fourier Transform (IFFT) operation and Cyclic Prefix (CP) insertion. Also, at data reception, the modem 1020 divides a baseband signal provided from the RF processor 1010 in the unit of OFDM symbol, restores signals mapped to subcarriers through a Fast Fourier Transform (FFT) operation, and then restores a reception bit stream through demodulation and decoding.

The backhaul communication unit 1030 provides an interface for performing communication with an upper node. In detail, the backhaul communication unit 1030 converts a bit stream transmitted from the eNB to the upper node into a physical signal, and converts a physical signal received from the controller 1050 into a bit stream.

The storage unit 1040 stores data of a basic program for an operation of the eNB, an application program, user contents and the like. And, the storage unit 1040 provides stored data according to a request of the controller 1050.

The controller 1050 controls general operations of the eNB. For example, the controller 1050 configures downlink data and provides the downlink data to the modem 1020, and interprets uplink data provided from the modem 1020. Also, the controller 1050 controls an HFN manager 1055.

When a ciphering scheme of a data radio bearer is set to an error correction scheme, that is, when a ciphering algorithm is set to "0011$_2$" or "0100$_2$", the HFN manager 1055 adds a partial HFN of a size of 1 byte to a PDCP packet at the time of PDCP packet configuration. Here, the partial HFN of the size of 1 byte represents a lower 8 bits among the whole HFN.

After that, the HEN manager 1055 performs the same operation as an existing PDCP operation. This process represents a process of transmitting a PDCP packet including a partial HFN to a reception side.

When the ciphering scheme of the data radio bearer is not set to the error correction scheme, that is, when the ciphering algorithm is not set to "0011$_2$" or "0100$_2$", the HFN manager 1055 performs the same operation as the existing PDCP operation. This represents a process of transmitting a general PDCP packet to the reception side.

Figure 11:
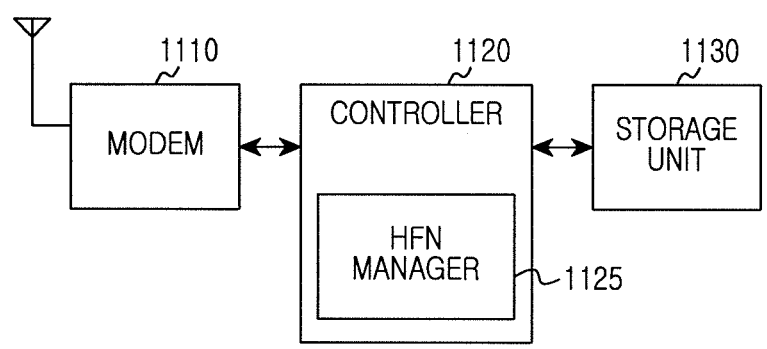
FIG. 11 is a block diagram illustrating a construction of a User Equipment (UE) according to an embodiment of the present disclosure.

FIG. 11 is a block diagram illustrating a construction of a UE according to an embodiment of the present disclosure.

Referring to FIG. 11, the UE includes a modem 1110, a controller 1120, and a storage unit 1130. The controller 1120 includes an HFN manager 1125.

The modem 1110, a module for communicating with other devices, includes a wireless processor, a baseband processor and the like. The wireless processor converts a signal received through an antenna into a baseband signal and provides the baseband signal to the baseband processor, and converts a baseband signal from the baseband processor into a wireless signal in order to actually transmit the baseband signal on a wireless path, and transmits the wireless signal through the antenna.

The controller 1120 controls a general operation of the UE and, particularly, controls the HFN manager 1125 according to the present disclosure.

The storage unit 1130 performs a function of storing a program for controlling a general operation of the UE and temporary data generated during program execution.

When a ciphering scheme of a data radio bearer is set to an error correction scheme, that is, when a ciphering algorithm is set to "0011$_2$" or "0100$_2$", the HFN manager 1125 compares a partial HFN included in a received PDCP packet with a lower 8 bits of its own HFN.

If the partial HFN is equal to the lower 8 bits of its own HEN, the HEN manager 1125 determines that its own HFN and an HFN of a transmit apparatus are the same as each other, and performs the same operation as an existing PDCP operation. Here, performing the same operation represents an operation of processing a received PDCP packet.

If the partial HFN is not equal to the lower 8 bits of its own HFN, the HFN manager 1125 determines that its own HFN and the HFN of the transmit apparatus are not the same as each other, and performs an HFN correction function so as to correct a ciphering error. The HFN correction function is illustrated in FIG. 9 above.

A UE can consistently apply a discard timer. However, for an eNB, when packets are exchanged between the eNBs, that is, when the packets are received by a target eNB (i.e., a serving eNB after handover) starting from a source eNB (i.e., a serving eNB before handover), the packets are in a state in which the source eNB has already operated a discard timer.

In the current standards, the source eNB cannot transmit discard timer information of all packets to the target eNB.

To solve this, in the present disclosure, the source eNB adds discard timer information shown in Table 4 below to a handover request message to the target eNB, so the target eNB estimates a discard timer of a packet, thereby continuously operating the discard timer that has operated in the source eNB.

TABLE 4

| Information Element (IE) | Presence | Description |
| --- | --- | --- |
| Remainder_discard_timer | O | Remainder discard timer value of the oldest packet of source eNB |
| Packet_count | M | Number of PDCP packets remaining when transmitting handover request message |
| Ratio_discard_timer | O | Ratio to apply discard timer in target eNB (enum 1, 4/5, 3/4, 2/3, 1/2, 1/3, 1/4, 1/5) |

Table 4 shows the discard timer information added to the handover request message. If a packet reaches a target eNB, its discard timer operates as in FIG. 12.

Figure 12:
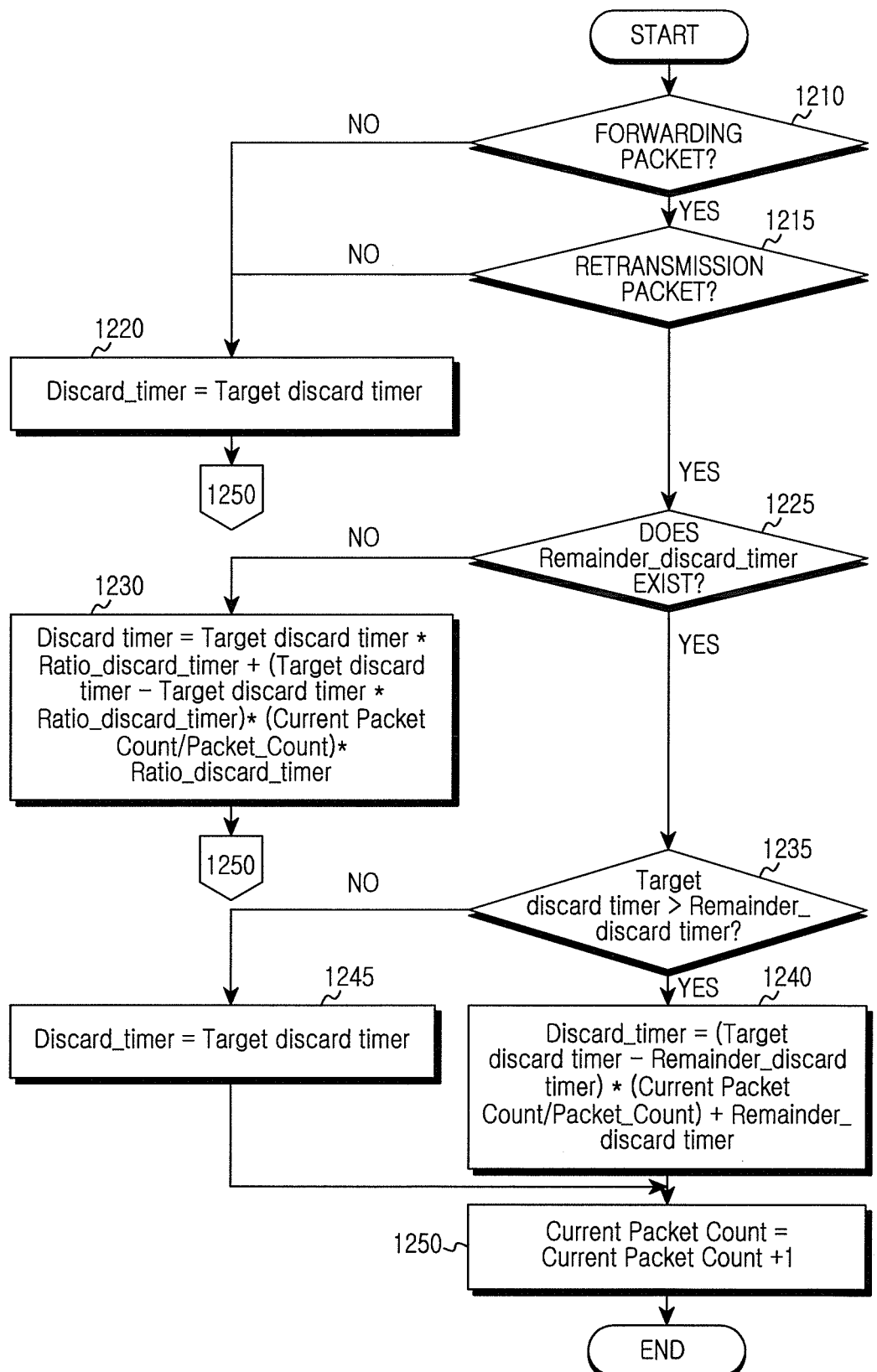
FIG. 12 is a flowchart illustrating a discard timer application process according to an embodiment of the present disclosure.

FIG. 12 is a flowchart illustrating a discard timer application process according to an embodiment of the present disclosure.

Referring to FIG. 12, if a received packet is not a forwarding packet in block 1210, because the received packet is a packet not processed in a source eNB, in block 1220, a target eNB applies its own discard timer. That is, the target eNB applies 'Discard timer=Target discard Timer'. Here, the 'Discard timer' represents a discard timer for a current packet, and the 'Target discard timer' represents a discard timer of the target eNB.

After that, in block 1250, the target eNB increases 'Current Packet Count' by '1'.

If the received packet is a packet forwarded to the target eNB in block 1210, the target eNB performs an operation as follows. The forwarded packet is distinguished into a retransmission packet and a non-retransmission packet.

If the forwarded packet is a non-retransmission packet in block 1215, because it is a packet not processed in the source eNB, in block 1220, the target eNB applies its own discard timer. That is, the target eNB applies the 'Discard timer=Target Discard timer'.

Next, in block 1250, the target eNB increases the 'Current Packet Count' by '1'.

If the forwarded packet is a retransmission packet in block 1215, the target eNB determines a discard timer on the basis of the discard timer information of Table 4 above.

The target eNB applies a value between its own discard timer and 'Remainder_discard_timer' to a packet in regular input order. As the packet is the latest, the target eNB sets a value close to a discard timer value of the target eNB.

If a 'Remainder_discard_timer' value exists in a received handover request message in block 1225 and the 'Remainder_discard_timer' value is not less than the 'Target discard timer' in block 1235, in block 1245, the target eNB applies its own discard timer. That is, the target eNB applies the 'Discard timer=Target discard timer'.

Next, in block 1250, the target eNB increases the 'Current Packet Count' by '1'.

If the 'Remainder_discard_timer' value exists in the received handover request message in block 1225 and the 'Remainder_discard_timer' value is less than the 'Target discard timer' in block 1235, in block 1240, the target eNB determines a discard timer as in Equation 1 below.

$$\text{discard timer} = (\text{Target discard timer} - \text{Remainder\_discard\_timer}) * (\text{Current Packet Count}/\text{Packet\_Count}) + \text{Remainder\_discard\_timer} \quad [\text{Eqn. 1}]$$

In Equation 1 above, the 'Target discard timer' represents a discard timer of the target eNB, the 'Remainder_discard_timer' represents a remainder discard timer of the oldest packet of a source eNB, the 'Packet_Count' represents the number of PDCP packets remaining when sending a handover request message, and the 'Ratio_discard_timer' represents a ratio to apply a discard timer in the target eNB.

Equation 1 above is a discard timer obtained for a current packet by subtracting 'Remainder_discard_timer' from 'Target discard timer', multiplying the subtraction value by a ratio of current packet to whole packet, and adding the multiplication value to a 'Remainder_discard_timer' value.

This is to, without setting a discard timer value to a 'Target discard timer' value, set a value adding a constant value to the Remainder_discard_timer value according to Equation 1 above, in consideration of the previously set upper layer setting (e.g., a TCP Window size and the like).

Next, in block 1250, the target eNB increases the 'Current Packet Count' by '1'.

If the 'Remainder_discard_timer' value does not exist in the received handover request message in block 1225, in block 1230, the target eNB estimates a discard timer value using the 'Ratio_discard_timer' and Equation 2 below.

$$\text{discard timer} = \text{Target discard timer} * \text{Ratio\_discard\_timer} + (\text{Target discard timer} - \text{Target discard timer} * \text{Ratio\_discard\_timer}) * (\text{Current Packet Count}/\text{Packet\_Count}) * \text{Ratio\_discard\_timer} \qquad [\text{Eqn. 2}]$$

In Equation 2 above, the 'Target discard timer' represents a discard timer of the target eNB, the 'Remainder_discard_timer' represents a remainder discard timer of the oldest packet of a source eNB, the 'Packet_Count' represents the number of PDCP packets remaining when sending a handover request message, and the 'Ratio_discard_timer' represents a ratio to apply a discard timer in the target eNB.

Equation 2 above determines a discard timer value as a value between a target discard timer and a discard timer value of the oldest packet in consideration of a ratio in packet order.

After that, in block 1250, the target eNB increases the 'Current Packet Count' by '1'.

In addition, by adding 3000 ms, 5000 ms, or 10,000 ms according to Table 5 below to a discard timer value, it can be such that the target eNB can flexibly apply a discard timer in a location of actual bad radio environments.

TABLE 5

| DiscardTimer |
| --- |
| 100 ms, 150 ms, 300 ms, 500 ms, 1500 ms, 3000 ms, 5000 ms, 10000 ms, infinity |

Table 5 above illustrates examples of a discard timer.

The discard timer setting function can be carried out by a controller 1050 of an eNB.

As described above, exemplary embodiments of the present disclosure have an advantage of being capable of forwarding a non-erroneous packet by sensing and correcting an error between an eNB and a UE.

Also, the embodiments of the present disclosure have an advantage of being capable of, after handover, continuously making use of a discard timer having operated in a source eNB (i.e., a serving eNB before handover), in a target eNB (i.e., a serving eNB after handover).

Also, the embodiments of the present disclosure enable selective operation of a discard timer by adding 3000 ms, 5000 ms, or 10,000 ms to a value of a current discard timer that is mostly expired, in a location of bad wireless environments.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for error correction deciphering for a receive apparatus in a mobile communication system, the method comprising:
   receiving a Packet Data Convergence Protocol (PDCP) packet;
   when error correction ciphering is set, acquiring a partial Hyper Frame Number (HFN) from the PDCP packet, the partial HFN having X bits;
   comparing the partial HFN and a lower X bits of the receive apparatus's own HFN; and
   if the partial HFN and the lower X bits of the receive apparatus's own HFN are different from each other, performing an HFN correction function.

2. The method of claim 1, further comprising:
   if the partial HFN and the lower X bits of the receive apparatus's own lower HFN are the same as each other, processing the received PDCP packet.

3. The method of claim 1, wherein performing the HFN correction function if the partial HFN and the lower X bits of the receive apparatus's own HFN are different from each other comprises:
   if the partial HFN is greater than the lower X bits of the receive apparatus's own HFN, and a difference between the partial HFN and the X bits of the receive apparatus's own HFN is less than '128', determining that the receive apparatus's own HFN is less than an HFN of a transmit apparatus; and
   setting X bits of the receive apparatus's own HFN like the partial HFN.

4. The method of claim 1, wherein performing the HFN correction function if the partial HFN and the lower X bits of the receive apparatus's own HFN are different from each other comprises:
   if the partial HFN is greater than the lower X bits of the receive apparatus's own HFN, and a difference between the partial HFN and the lower X bits of the receive apparatus's own HFN is greater than '128', and the receive apparatus's own HFN is equal to or greater than '256', determining that the receive apparatus's own HFN is greater than an HFN of a transmit apparatus; and
   setting X bits of the receive apparatus's own HFN like the partial HFN, and subtracting '256' from the receive apparatus's own HFN.

5. The method of claim 1, wherein performing the HFN correction function if the partial HFN and the lower X bits of the receive apparatus's own HFN are different from each other comprises:
   if the partial HFN is less than the lower X bits of the receive apparatus's own HFN, and a difference between the partial HFN and the lower X bits of the receive apparatus's own HFN is less than '128', determining that the receive apparatus's own HFN is greater than an HFN of a transmit apparatus; and
   setting X bits of the receive apparatus's own HFN like the partial HFN.

6. The method of claim 1, wherein performing the HFN correction function if the partial HFN and the lower X bits of the receive apparatus's own HFN are different from each other comprises:
   if the partial HFN is less than the lower X bits of the receive apparatus's own HFN, and a difference between the partial HFN and the lower X bits of the receive apparatus's own HFN is greater than '128' determining that the receive apparatus's own HFN is less than an HFN of a transmit apparatus; and setting X bits of the receive apparatus's own HFN like the partial HFN, and adding '256' to the receive apparatus's own HFN.

7. The method of claim 1, wherein the HFN correction function that is performed is determined based on a difference between the partial HFN and the lower X bits of the receive apparatus's own HFN.

8. A method for error correction ciphering for a transmit apparatus in a mobile communication system, the method comprising:

when error correction ciphering is set, acquiring X lower bits from the transmit apparatus's own Hyper Frame Number (HFN);

adding the X lower bits from the transmit apparatus's own HFN to a Packet Data Convergence Protocol (PDCP) packet to complete the PDCP packet; and transmitting the completed PDCP packet.

9. The method of claim 8, further comprising, when the error correction ciphering is not set:

completing the PDCP packet without adding the X lower bits from the transmit apparatus's own HFN to the PDCP packet; and transmitting the completed PDCP packet.

10. The method of claim 8, wherein the completed PDCP packet is configured to be used by a receive apparatus to perform a HFN correction function.

11. A receive apparatus for error correction deciphering in a mobile communication system, the apparatus comprising:

a modulator/demodulator (modem) configured to receive a Packet Data Convergence Protocol (PDCP) packet; and a controller configured to, when error correction ciphering is set, acquire a partial Hyper Frame Number (HFN) from the PDCP packet, the partial HFN having X bits, compare the partial HFN and a lower X bits of the receive apparatus's own HFN, and, if the partial HFN and the lower X bits of the receive apparatus's own HFN are different from each other, perform an HFN correction function.

12. The apparatus of claim 11, wherein, if the partial HFN and the lower X bits of the receive apparatus's own HFN are the same as each other, the controller is configured to process the received PDCP packet.

13. The apparatus of claim 11, wherein, when the controller performs the HFN correction function if the partial HFN and the lower X bits of the receive apparatus's own HFN are different from each other, if the partial HFN is greater than the lower X bits of the receive apparatus's own HFN, and a difference between the partial HFN and the X bits of the receive apparatus's own HFN is less than '128', the controller is configured to determine that the receive apparatus's own HFN is less than an HFN of a transmit apparatus, and set X bits of the receive apparatus's own HFN like the partial HFN.

14. The apparatus of claim 11, wherein, when the controller performs the HFN correction function if the partial HFN and the lower X bits of the receive apparatus's own HFN are different from each other, if the partial HFN is greater than the lower X bits of the receive apparatus's own HFN, and a difference between the partial HFN and the lower X bits of the receive apparatus's own HFN is greater than '128', and the receive apparatus's own HFN is equal to or greater than '256', the controller is configured to determine that the receive apparatus's own HFN is greater than an HFN of a transmit apparatus, and set X bits count of the receive apparatus's own HFN like the partial HFN and subtract '256' from the receive apparatus's own HFN.

15. The apparatus of claim 11, wherein when the controller performs the HFN correction function if the partial HFN and the lower X bits of the receive apparatus's own HFN are different from each other, if the partial HFN is less than the lower X bits of the receive apparatus's own HFN, and a difference between the partial HFN and the lower X bits of the receive apparatus's own HFN is less than '128', the controller is configured to determine that the receive apparatus's own HFN is greater than an HFN of a transmit apparatus, and set X bits of the receive apparatus's own HFN like the partial HFN.

16. The apparatus of claim 11, wherein when the controller performs the HFN correction function if the partial HFN and the lower X bits of the receive apparatus's own HFN of are different from each other, if the partial HFN is less than the lower X bits of the receive apparatus's own HFN, and a difference between the partial HFN and the lower X bits of the receive apparatus's own HFN is greater than '128', the controller is configured to determine that the receive apparatus's own HFN is less than an HFN of a transmit apparatus, and set X bits of the receive apparatus's own HFN like the partial HFN and add '256' to the receive apparatus's own HFN.

17. The apparatus of claim 11, wherein the HFN correction function that is performed is determined based on a difference between the partial HFN and the lower X bits of the receive apparatus's own HFN.

18. A transmit apparatus for error correction ciphering in a mobile communication system, the apparatus comprising:

a controller configured to, when error correction ciphering is set, acquire X lower bits from the transmit apparatus's own Hyper Frame Number (HFN), and add the X lower bits from the transmit apparatus's own HFN to a Packet Data Convergence Protocol (PDCP) packet to complete the PDCP packet; and a modulator/demodulator (modem) configured to transmit the completed PDCP packet.

19. The apparatus of claim 18, wherein, when the error correction ciphering is not set, the controller is configured to complete the PDCP packet without adding the X lower bits from the transmit apparatus's own HFN in the PDCP packet, and the modem is configured to transmit the completed PDCP packet.

20. The apparatus of claim 18, wherein the completed PDCP packet is configured to be used by a receive apparatus to perform a HFN correction function.

* * * * *